(12) United States Patent
Smart et al.

(10) Patent No.: US 9,347,673 B1
(45) Date of Patent: May 24, 2016

(54) UNIVERSAL CONVECTION MANIPULATION DEVICE AND METHODS

(71) Applicants: Jeffrey Dennis Smart, Torrington, CT (US); James Knowles, Round Hill, VA (US)

(72) Inventors: Jeffrey Dennis Smart, Torrington, CT (US); James Knowles, Round Hill, VA (US)

(73) Assignee: PIZZA DOME LLC, Round Mill, VA (US)

( * ) Notice: Subject to any disclaimer, the term of this patent is extended or adjusted under 35 U.S.C. 154(b) by 0 days.

(21) Appl. No.: 14/811,216

(22) Filed: Jul. 28, 2015

(51) Int. Cl.
| F24C 15/16 | (2006.01) |
| F24C 15/00 | (2006.01) |
| A47J 36/16 | (2006.01) |
| F24C 15/24 | (2006.01) |
| A21B 1/50 | (2006.01) |
| A21B 1/02 | (2006.01) |

(52) U.S. Cl.
CPC .............. *F24C 15/007* (2013.01); *A47J 36/16* (2013.01); *F24C 15/24* (2013.01); *A21B 1/02* (2013.01); *A21B 1/50* (2013.01); *F24C 15/16* (2013.01)

(58) Field of Classification Search
None
See application file for complete search history.

(56) References Cited

U.S. PATENT DOCUMENTS

| 2,593,077 | A | * | 4/1952 | Vogt | ......................... | A47J 43/18 |
| | | | | | | 126/337 R |
| 3,712,285 | A | | 1/1973 | Copeland | | |
| 4,383,823 | A | * | 5/1983 | Williams | ................. | A21B 1/48 |
| | | | | | | 432/148 |
| 4,535,753 | A | | 8/1985 | Zayauskas | | |

(Continued)

FOREIGN PATENT DOCUMENTS

| FR | 2659425 A1 | 9/1991 |
| FR | 2720817 A1 | 12/1995 |
| WO | 2007030903 A1 | 3/2007 |

OTHER PUBLICATIONS

"Sheet Pan," Wikipedia, printed: Feb. 22, 2016; refers to pans publicly available prior to Jul. 28, 2015.*

(Continued)

*Primary Examiner* — Joseph M Pelham
(74) *Attorney, Agent, or Firm* — PK Patent Law (57) ABSTRACT

A universal convection manipulation device for insertion into a conventional oven and a method of use are provided. The universal convection manipulation device includes a substantially rectangular flexible sheet of material including an intermediate body portion. The intermediate body portion includes a first flange arranged along an end of the intermediate body portion and a second flange arranged along an opposite end of the intermediate body portion. The flexible sheet of material is capable of being flexed into an arched shape and sized to be insertable into various sized conventional ovens depending on the amount of flexure of the sheet of material. The first flange and the second flange are shaped so that they are capable of being inserted and held with a tension against a sidewall support structure of a conventional oven when the flexible sheet of material is flexed into the arched shape and released during installation within the conventional oven. The flexible sheet of material lies substantially flat in a relaxed, unflexed condition.

20 Claims, 6 Drawing Sheets

(56) References Cited

U.S. PATENT DOCUMENTS

| | | | | |
|---|---|---|---|---|
| 4,631,786 A | * | 12/1986 | Curry | E06B 3/24 160/392 |
| 5,779,080 A | * | 7/1998 | Corse | A21B 3/13 220/4.28 |
| 6,065,394 A | * | 5/2000 | Gelderman | A47J 37/10 99/424 |
| 6,104,004 A | | 8/2000 | Ragland et al. | |
| 6,546,850 B1 | * | 4/2003 | Akiyama-Warren | A47J 36/20 220/573.4 |
| 8,011,292 B1 | * | 9/2011 | Logan | A21B 3/15 126/390.1 |
| 9,052,117 B2 | * | 6/2015 | Ajmera | A21B 1/50 |
| 2002/0166459 A1 | * | 11/2002 | Hinton | A21B 3/132 99/467 |
| 2006/0289435 A1 | * | 12/2006 | Park | F24C 15/322 219/394 |
| 2008/0217341 A1 | * | 9/2008 | Wolever | A21B 3/132 220/573.1 |
| 2009/0194089 A1 | * | 8/2009 | Durney | B21D 11/10 126/19 R |
| 2012/0167780 A1 | | 7/2012 | Houston | |
| 2012/0270171 A1 | * | 10/2012 | Ajmera | A21B 1/50 432/148 |
| 2013/0192475 A1 | * | 8/2013 | Lynn | A47J 27/00 99/444 |
| 2013/0277374 A1 | * | 10/2013 | Lewis | A47J 36/16 220/573.4 |
| 2014/0199458 A1 | | 7/2014 | Chanda | |

OTHER PUBLICATIONS

"Calphalon 4-Piece Nonstick Cookie Sheet Set," at "Bed, Bath & Beyond," web site, printed Feb. 22, 2016; refers to cookie sheets available prior to Jul. 28, 2016.*

* cited by examiner

UNIVERSAL CONVECTION MANIPULATION DEVICE AND METHODS

FIELD OF THE INVENTION

The present teachings relate to an accessory for conventional ovens. In particular, the present teachings relate to a device that can be inserted into any conventional oven that can convert the oven into a high-heat commercial oven.

BACKGROUND OF THE INVENTION

A well-known problem of conventional ovens is that they can dehydrate food items being cooked. For example, since conventional ovens are not capable of reaching the temperatures of a high-heat commercial oven they dehydrate dough thereby making the final bread product dry and unappealing.

It is known to use curved or domed inserts in cooking ovens which serve to confine and direct heat towards the food being cooked. However, existing designs typically are formed into a single rigid shape which limit their applicability, i.e., they are limited to a particular size and configuration of oven which means different sized inserts are required for each oven-type found in a home or dining establishment.

Moreover, since rigid inserts are inherently three-dimensional and therefore awkwardly shaped they require a large amount of storage space which is extremely undesirable as storage space in kitchens is always at a premium.

Other rigid inserts are small and do not create a large space required for cooking. Such size constraints limit the types of food that can be cooked making it impossible to cook a chicken, a turkey, or even a roast. Their small size also jeopardize convection currents causing uneven cooking while also making it difficult to see the item being cooked.

Devices for reflecting heat for use over an outdoor cooking grill are also known. These devices can include a foldable frame which is adapted to receive a flexible heat-reflecting member which is supported over the grilling area. However, these heat reflecting devices are supported for an outdoor grilling area and are not sized or adaptable for use in the enclosed space of a conventional oven for home use.

Accordingly, there exists a need for a convection manipulating device that can create a high-heat baking oven from any conventional oven that is easy-to-use and adaptable for storage in a limited-sized space.

SUMMARY OF THE INVENTION

The present teachings provide a universal convection manipulation device for insertion into various sized conventional ovens. The universal convection manipulation device can include a substantially rectangular flexible sheet of material including an intermediate body portion including a first flange arranged along an end of the intermediate body portion and a second flange arranged along an opposite end of the intermediate body portion. The flexible sheet of material can be capable of being flexed into an arched shape and sized to be insertable into various sized conventional ovens depending on the amount of flexure of the sheet of material. The first flange and the second flange can be shaped so that they are capable of being inserted and held with a tension against a sidewall support structure of the various sized conventional ovens when the flexible sheet of material is flexed into the arched shape and released during installation within the conventional ovens. The flexible sheet of material can lie substantially flat in a relaxed, unflexed condition.

The present teachings provide another embodiment of a universal convection manipulation device capable of use in various sized conventional ovens. The universal convection manipulation device can include a substantially rectangular flexible sheet of material capable of being flexed into an arched shape and sized to be insertable into the various sized conventional ovens depending on the amount of flexure of the sheet of material. The flexible sheet of material can include a length of from about 26 inches to about 32 inches and a width of from about 15.5 inches to about 17 inches thereby being configured to leave a gap of at least one inch with a back wall portion of the various sized conventional ovens when installed therein. A first flange can be arranged along an end of the flexible sheet of material and a second flange can be arranged along an opposite end of the flexible sheet of material and can be shaped so as to be held with tension against a sidewall support structure of the various sized conventional ovens when the flexible sheet of material is flexed into the arched shape and released when installed within the various sized conventional ovens. The flexible sheet of material can lie substantially flat in a relaxed, unflexed condition.

The present teachings still further provide a method of creating a high-heat baking oven in a conventional convection oven. The method can include providing a substantially rectangular flexible sheet of material including an intermediate body portion and a first flange arranged along an end of the intermediate body portion and a second flange arranged along an opposite end of the intermediate body portion. The substantially rectangular flexible sheet of material can then be flexed into an arched shape that is smaller than a width of an opening of the conventional oven. The flexed substantially rectangular flexible sheet of material can then be inserted into the conventional oven such that the first flange and the second flange align approximately with a sidewall support structure of the conventional oven. The flexed substantially rectangular flexible sheet of material can then be released such that a flexibility of the sheet creates a tension that allows the flexed substantially rectangular flexible sheet of material to be held with tension against a sidewall support structure of the conventional oven.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

Figure 1:
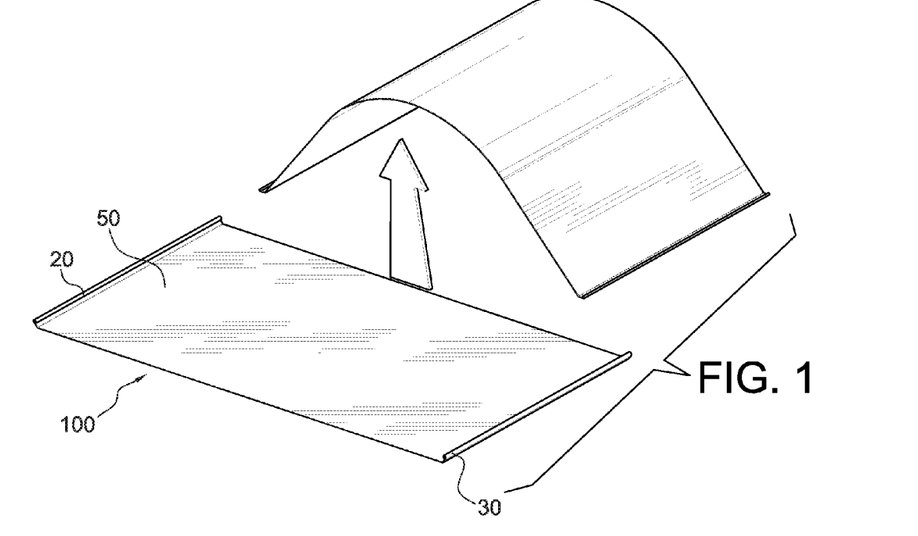
FIG. 1 shows a perspective view of the universal convection manipulation device of the present teachings in both its flat and flexed configurations.

Referring to FIG. 1, a universal convection manipulation device 100 of the present teachings can include a generally rectangular, flexible piece of sheet material. The convection manipulation device 100 can include an intermediate body portion 50 formed with a first flange 20 and a second flange 30 along respective opposite ends of the intermediate body portion 50. The flexibility and size of the convection manipulation device 100 of the present teachings allows a user to bend the universal convection manipulation device 100 into a variable-sized arch-shape for insertion into any conventional oven.

The various embodiments of the universal convection manipulation device 100 disclosed herein relate generally for use within a conventional oven. As used herein, the term conventional oven relates to any household oven used for roasting, heating, and the like. Such a conventional oven can include an interior opening having a width from about 22 inches to about 26 inches. Conventional ovens can typically be fueled by natural gas, propane, or electricity but any other fuel could be implemented.

As will be disclosed in more detail below, when inserted into a conventional oven the parabolic arch-shape operates to create a perfect undisrupted convection pattern under the dome that generates consistent and even high-heat temperatures of up to about 735°. As a result, the universal convection manipulation device 100 of the present teachings can convert any conventional oven into a high-heat baking oven.

Figure 2A:
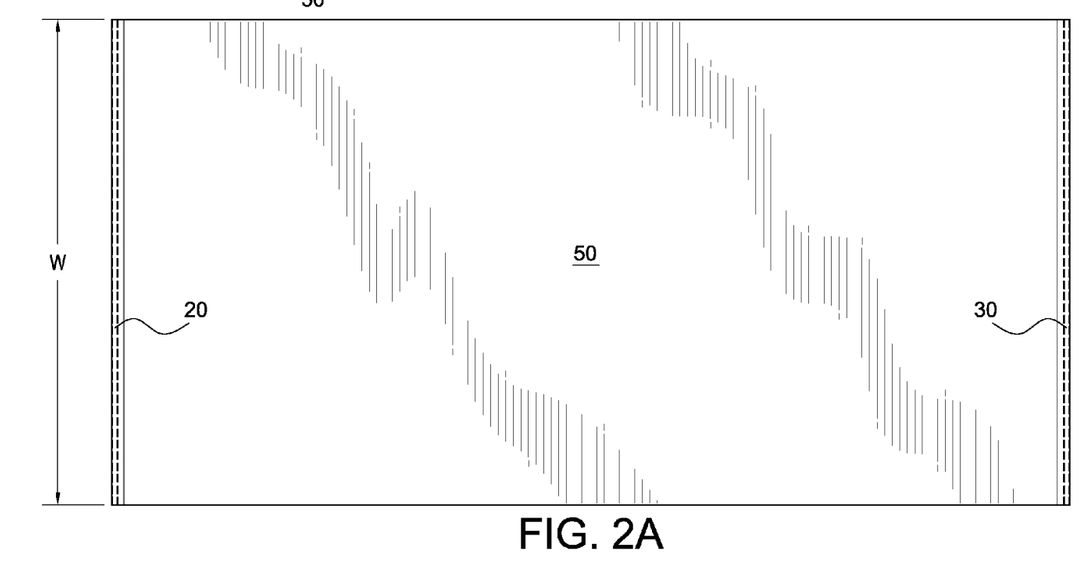
FIG. 2A shows a top view of the universal convection manipulation device of the present teachings.

The convection manipulation device 100 can be sized so as to be adaptable to any conventional oven. Referring to FIG. 2A, the length, L, of the convection manipulation device 100 can be from 26 inches to about 32 inches, and preferably has a length of about 31.6 inches. The width, W, of the convection manipulation device 100 can be from 15.5 inches to about 17 inches, and preferably has a width of about 16 inches. The dimensions of the width, W, allows for a minimum of about a 1 inch gap for ventilation between the installed convection manipulation device 100 and the back wall 390 of a conventional oven 300. As will be discussed in more detail below, the dimensions of the convection manipulation device 100, and in particular, the width, W, are critical to allow for proper ventilation during use.

Figures 2B, 2C:
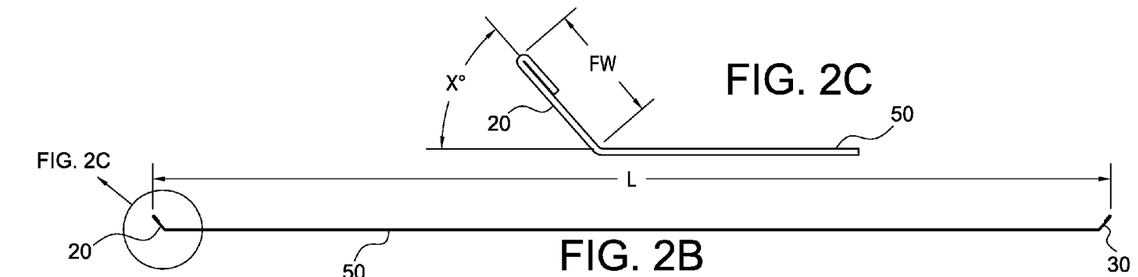
FIG. 2B shows a side view of the universal convection manipulation device of the present teachings.
FIG. 2C shows a blow-up view of section A of FIG. 2B.

As shown in FIGS. 2B and 2C, in a relaxed state of the convection manipulation device 100 (i.e. in a non-arched position), each of the first flange 20 and the second flange 30 can angle upwardly with respect to the intermediate body portion 50. The first flange 20 and the second flange 30 can each be angled in a manner such that they can extend substantially horizontally when the convection manipulation device 100 is bent into a parabolic arched shape. The upwardly extending flanges 20, 30 can form oven wall engagement portions.

Referring to FIG. 2C, the first flange 20 can form an angle, X°, of from about 45° to about 52°, and preferably about 49°, with respect to the intermediate body portion 50. The flange width, FW, can be from 0.4 inches to about 1 inch, and preferably has a width of about 0.6 inches. Similarly, the angle and width of the second flange 30 can mirror that of the first flange 20. Moreover, the ends of each of the first and second flanges 20, 30 can be bent to create a rounded edge to prevent scratching of the oven wall or to prevent injury to the user.

The convection manipulation device 100 of the present teachings can be made from flexible gauged cooking grade sheet metal but any lightweight and flexible sheet material could be implemented. For example, the convection manipulation device 100 can be made from metal, heat-resistant plastic, carbon fiber composite, or, if the device 100 is intended to be disposable, cardboard or paperboard. Exemplary sheet metal material can include copper, stainless steel, steel, and the like. However, any material is acceptable provided that it is sufficiently flexible to be flexed into the arched-shape operative configuration and is sufficiently heat-resistant to withstand at least one period of exposure to the high-temperature of the oven. The sheet material can have a gauge of from about 0.16 GA to about 0.28 GA and preferably has a gauge of about 0.22 GA.

Figure 3:
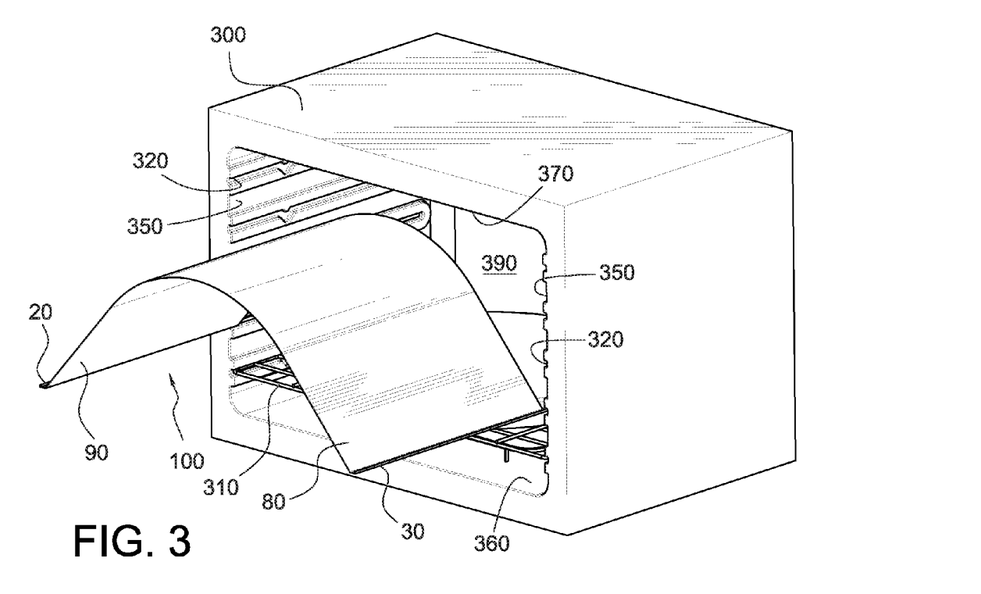
FIG. 3 shows a perspective view of the universal convection manipulation device of the present teachings being inserted into a conventional oven.

Referring to FIG. 3, when the convection manipulation device 100 is bent into a parabolic arch, the first flange 20 and the second flange 30 can be arranged in a position for insertion into the groves, extensions, or similar sidewall support structure 320 formed in the sidewalls 350 of any conventional oven 300. The sidewall support structure 320 can correspond to the structure that supports and secures the oven's adjustable wire rack shelving 310. Due to the flexibility of the convection manipulation device 100, a tension is created that allows the convection manipulation device 100 to fit securely into the sidewall support structure 320 of the conventional oven 300. Alternatively, the sidewall support structure 320 can include the vertical sidewalls 350 of the conventional oven 300. In a flexed or arched-shaped state as shown in FIG. 3, the convection manipulation device 100 forms a dome that creates undisrupted convection currents and provides a heat-reflecting surface for cooking food under the dome.

The universal convection manipulation device 100 can have a top surface 80 and a bottom surface 90. To more efficiently reflect heat, the bottom surface 90 of the convection manipulation device 100 can include a heat-reflecting coating. Depending on the material making up the device 100, the heat-reflective coating can include metal foil, metal plating, or any other surface treatment sufficient to render the bottom surface 90 reflective.

The first and second flanges 20, 30 can include protection means, such as an applied reinforcement member or coating that provides protection from wear or other damage. For example, a coating of titanium dioxide ($TiO_2$), a diamond-like coating (DLC), or other wear-resistant material can be applied to the flanges 20, 30 to provide wear resistance. Alternatively or additionally, a friction-reducing coating such as polytetrafluoroethylene, marketed as Teflon® by DuPont, can be applied to the flanges 20, 30 to facilitate insertion into the sidewall support structure 320 of conventional ovens.

FIG. 3 shows the convection manipulation device 100 just prior to being inserted into a conventional oven 300. The interior of the convection oven 300 includes a floor 360, a ceiling 370, sidewalls 350, and a back wall 390. The sidewalls 350 can include the grooves, extensions, or any similar structure 320 that can receive and support the side edges of the removable wire racks or shelves 310 for the conventional oven 300. In use, the convection manipulation device 100 can be grasped by the user at its front edge and flexed so that the device 100 is arched in a manner that the distance between the first flange 20 and the second flange 30 is slightly less than the width of the interior of the conventional oven 300. The flanges 20, 30 are then aligned with the selected sidewall support structure 320 in the sidewalls 350 of the conventional oven 300. The convection manipulation device 100 is slid along the grooves 320 until the device 100 is fully inside of the conventional oven 300, as shown in FIG. 4.

When the convection manipulation device 100 is released, the inherent flexibility of the device 100 causes each of the first and second flanges 20, 30 to seat themselves into the sidewall support structure 320, such as selected grooves or directly against the sidewalls, and be retained there. Differences in the width of the interiors of conventional ovens 300, as well as variations in the configuration of grooves, extensions, or similar structure 320 in the sidewalls 350 are automatically compensated for by the flexibility of the convection manipulation device 100 of the present teachings.

Figure 5:
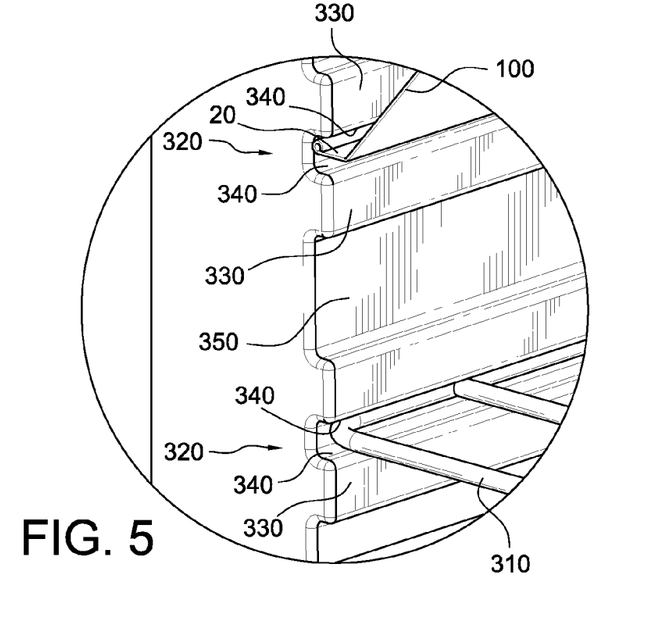
FIG. 5 shows a perspective blow-up view of a first flange of the device of the present teachings in engagement with an interior sidewall of the oven.

FIG. 5 shows the engagement of the first flange 20 with one set of grooves 320 in the left sidewall 350 of the conventional oven 300. Each of the grooves 320 is formed by the upper and lower surfaces 340 of rectangular projections 330. Of course, the configuration of the structure that forms the grooves 320 can vary from oven to oven and the convection manipulation device 100 of the present teachings is capable of fitting into any sidewall support structure 320 that is intended to receive and support a wire rack or shelf 310. Alternatively, the first and second flanges 20, 30 can be configured to seat directly against sidewall support structure 320 defined by the sidewalls 350 of any conventional oven 300.

Figure 4:
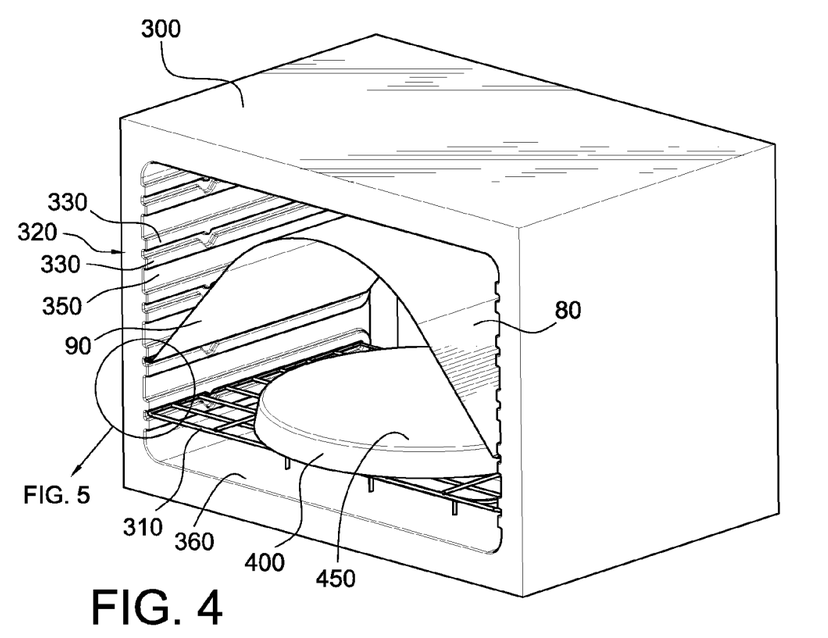
FIG. 4 shows a perspective view of the universal convection manipulation device of the present teachings being inserted into a conventional oven along with a food item to be cooked.

A pizza or other food item 450 can then be inserted and supported on a baking stone or pan 400 below the convection manipulation device 100, as shown in FIG. 4. The baking stone or pan 400 can be supported on the wire rack or shelf 310.

Figure 6:
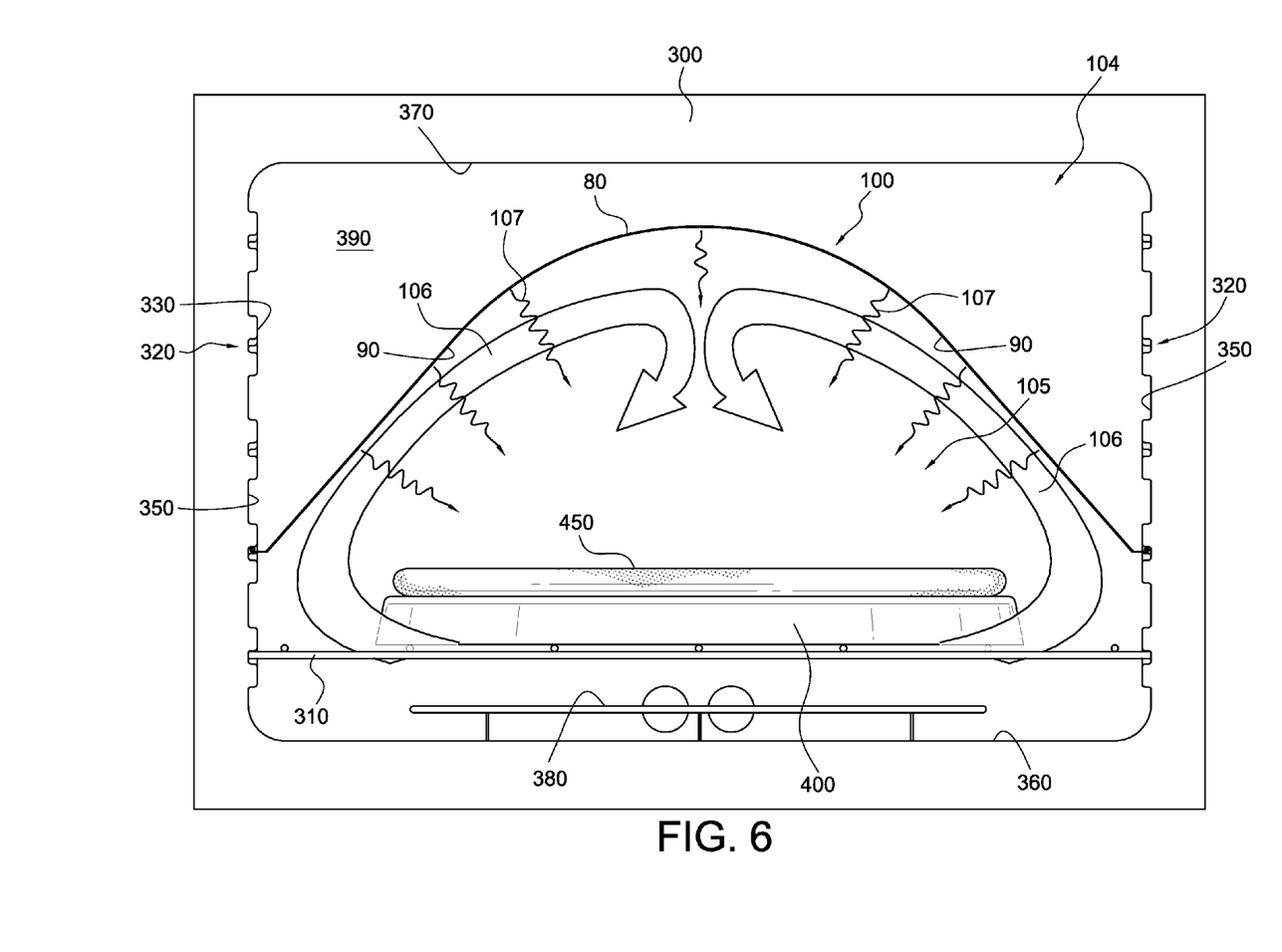
FIG. 6 shows a front view of the universal convection manipulation device of the present teachings inserted into a conventional oven along with convection currents and radiant heat.

FIG. 6 illustrates how the convection manipulation device 100 of the present teachings operates to convert any conventional oven 300 into a high-heat baking oven to cook a food item 450. The parabolic arch of the installed convection manipulation device 100 forms a dome that divides the interior of the conventional oven 300 into an upper volume 104 and a lower volume 105.

The parabolic arch shapes the lower volume 105 under the dome in a specific way such that it manipulates the convection pattern to create an area of intensified heat for efficient cooking of a food item 450. More particularly, when the conventional oven 300 is turned on, an area of intensified heat is formed by and below the convection manipulation device 100. The intensified heat is of at least two types: convection heat and radiant heat. The convection currents operate to transfer heat from the air to the food item 450. The formed convection currents 106 created by the heating element 380 are directed by the parabolic shape of the bottom surface 90 of the convection manipulation device 100 to flow in a perfect undisrupted convection pattern. The undisrupted convection pattern is from the bottom of the oven interior along the respective angled lower surfaces 90 of the convection manipulation device 100 and then meeting in the vicinity at the top of the arch or dome. The undisrupted convection pattern creates a swirling air flow that intensifies the heat and efficiently transfers heat to the food item 450. Concurrently, radiant heat, emitted by heating element 380 is reflected downwardly by the parabolic shape of the convection manipulation device 100 and, as indicated by arrows 107, is focused upon the top of food item 450. Heat can also be transmitted conductively through the baking stone or pan 400 to the bottom of food item 450.

As shown in FIG. 6, the convection manipulation device 100 converts the entire width of the conventional oven 300 into a high-heat oven. The dome shape of the installed convection manipulation device 100 generates a superior air flow pattern that swirls downwardly onto the top side of the food being cooked while forming a large baking area. This can allow more than one item to be cooked, such as a chicken, potatoes and vegetables, or a large turkey.

The dome shape of the installed convection manipulation device 100 creates higher temperatures without the use of additional energy. The convection manipulation device 100 saves energy as it creates intensified temperatures under the dome compared to the actual temperature setting of the oven. For example, with the oven set at 300° F., the temperature under the dome can be a consistent 450° F., and with the oven set at 500° F., the temperature under the dome can be a consistent 735° F. This allows foods be cooked evenly from the top, to the bottom and sides.

The dimension of the width, W, of the convection manipulation device 100 allows for proper ventilation of the oven. In particular, the proper ventilation can be achieved by allowing a minimum gap of about 1 inch between the convection manipulation device 100 and the back wall 390 of any conventional oven. The adequate gap can be achieved by providing the convection manipulation device 100 with a width of from about 15.5 inches to about 17 inches. The convection manipulation device 100 of the present teachings allows the outside of the oven to remain at acceptable temperatures while creating perfect undisrupted convection patterns that can help generate high temperatures of up to about 735° F. under the dome.

When the baking process is completed and the oven 300 is turned off, the convection manipulation device 100 can be removed from the oven when it is cool enough to do so. To remove, the convection manipulation device 100 is grasped by the user at its front edge and flexed so that the device 100 is arched in a manner that the distance between the first flange 20 and the second flange 30 is slightly less than the width of the interior of the conventional oven 300. The convection manipulation device 100 is then slid and/or removed until the device 100 is fully outside of the oven 300. The convection manipulation device 100 can then be stored in a relaxed, substantially flat state. As with a conventional cooking sheet, the convection manipulation device 100 can be conveniently stored in a narrow space.

The convection manipulation device 100 of the present teachings can create the environment of a world-class commercial baking oven in a conventional oven commonly found in the home. The high temperature and undisrupted convection patterns created by the convection manipulation device 100 sears the dough before the moisture can escape making the final product like that cooked in a professional commercial oven. The convection manipulation device 100 is excellent for baking pizza in 5-10 minutes allowing the dough to be crispy but chewy and not dried out. The convection manipulation device 100 is also excellent for searing meats, for baking artisan breads, for baking any kind of flat bread, or any known baking purpose.

Figure 7:
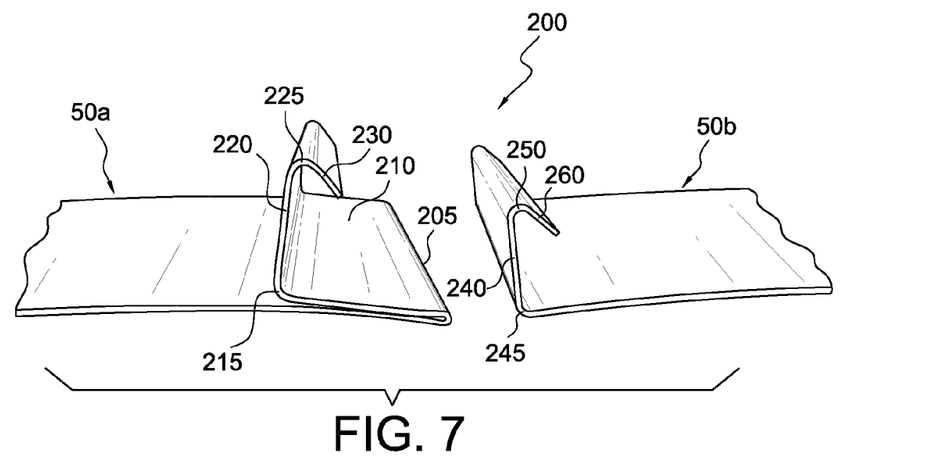
FIGS. 7-9 show perspective views of a joint for a multi-piece embodiment of the universal convection manipulation device of the present teachings.
Figure 8:
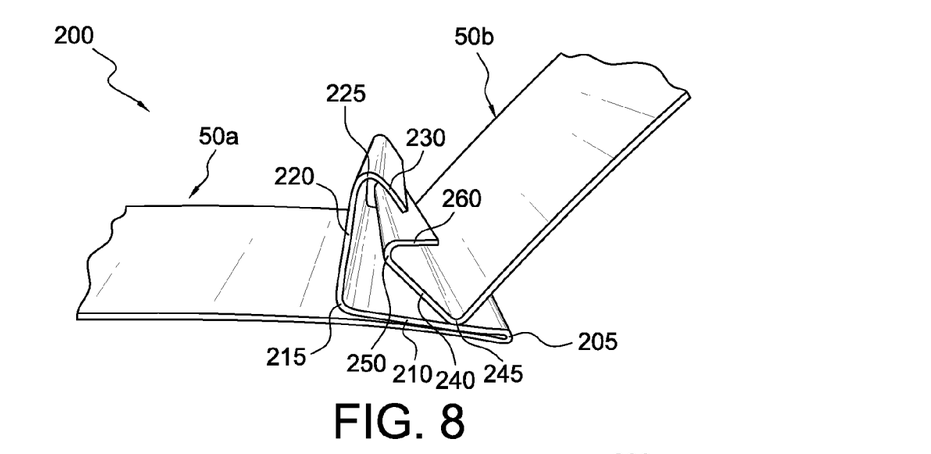
Figure 9:
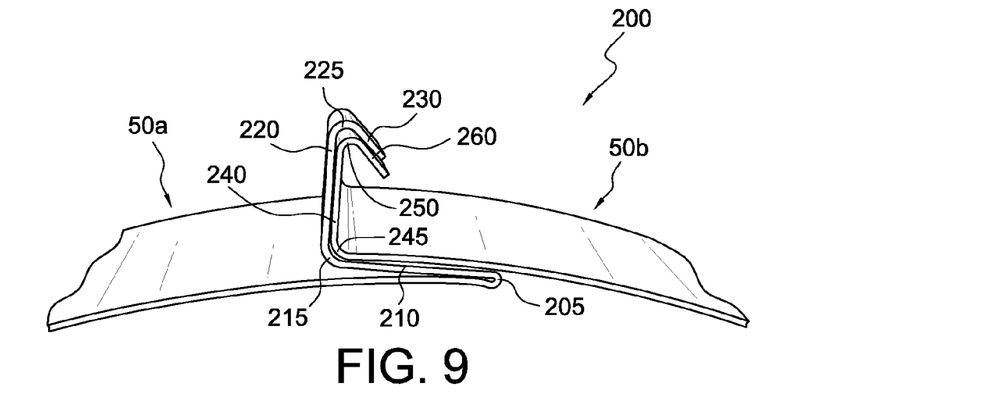

According to various embodiments, the convection manipulation device 100 of the present teachings can be designed for more compact storage by allowing the device 100 to break down or fold into two or more sections. For example, the convection manipulation device 100 can be designed to separate into two or more sections, such as, for example, at a mid-point along its length. As shown in FIGS. 7-9, at the mid-point a joint 200 can be provided to releasably divide the intermediate body portion 50 of the device 100 into at least two separate sections 50*a* and 50*b*.

As best shown in FIG. 7, the left half of the joint 200 can be provided on the end edge of section 50*a*. The left half of the joint 200 can include a folded back first segment 210 by way of bend 205. Extending approximately 90° to the first segment 210 is a second segment 220 by way of bend 220. A first hook section 230 can be bent at about 45° with respect to second segment 220 and can be connected to second segment 220 by way of bend 225.

The right half of the joint 200 can be provided on the end edge of section 50*b*. The right half of the joint 200 can include a third segment 240 connected to the main body of section 50*b* by bend 245. A second hook section 260 can be bent at about 45° with respect to third segment 240 and can be connected to third segment 240 by bend 250.

As seen in FIGS. 8 and 9, the sections 50*a* and 50*b* can be connected by placing bend 245 onto first segment 210 at an angle so that second hook portion 260 is located below first hook portion 230. Downward rotation of section 50*b* relative to section 50*a* moves the two halves of joint 200 into nested engagement as shown in FIG. 8. In a final nested arrangement, the joint 200 joins sections 50*a* and 50*b* together so that the convection manipulation device 100 can extend substantially flat in a relaxed state. When the convection manipulation device 100 is flexed for insertion into a conventional oven 300, the joint 200 provides a smooth transition between sections 50*a* and 50*b* so that the parabolic arch formed by the convection manipulation device 100 is substantially the same as that formed by a unitary convection manipulation device 100.

Figure 10:
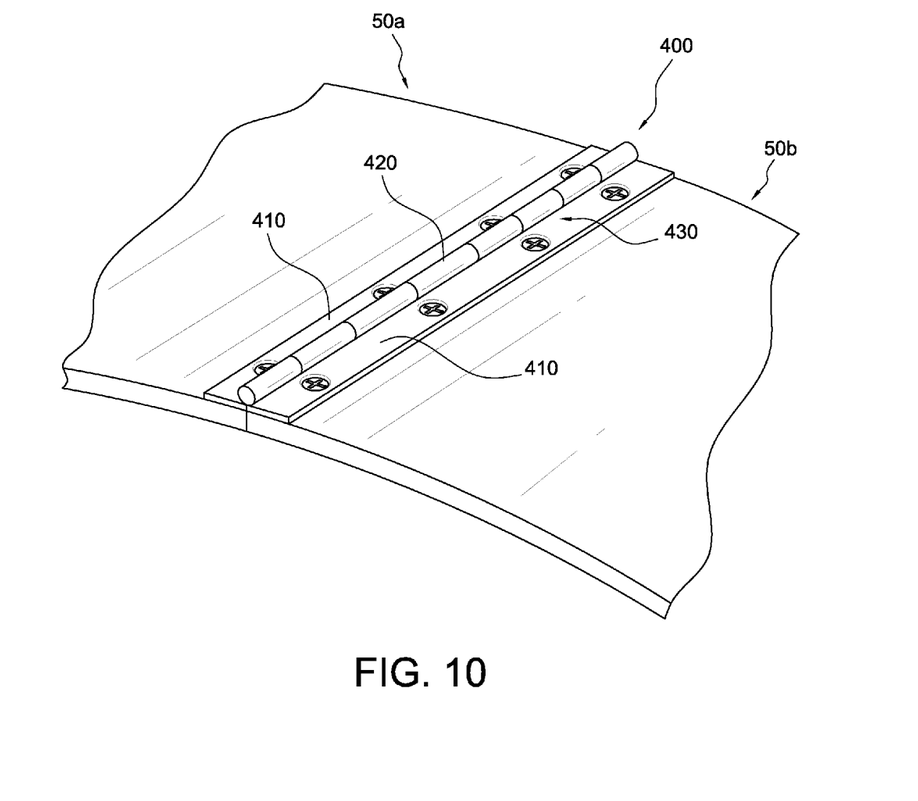
FIG. 10 shows a perspective view of another embodiment of a joint for a multi-piece embodiment of the universal convection manipulation device of the present teachings.

Another embodiment of a joint 400 suitable for joining sections 50*a* and 50*b* is shown in FIG. 10. The joint 400 can include a hinge 430 that includes leaves 410 joined by a hinge pin 420. Hinge 430 can be designed so that it opens flat and is restricted from opening further, i.e., to a maximum angle of 180°. As a result, the joint 400 allows the convection manipulation device 100 to lie substantially flat while allowing a parabolic arch to be formed when convection manipulation device 100 is flexed. Since the hinge 430 can be permanently attached to sections 50*a* and 50*b*, such as by rivets, screws, welding and the like, there is no chance that sections 50*a* and 50*b* will be accidently separated, lost, or mismatched with sections of a different sizes. It will be appreciated that the hinge 430 can be integrally formed with sections 50*a* and 50*b*.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A universal convection manipulation device and conventional oven comprising:
   a substantially rectangular flexible sheet of material including an intermediate body portion including a first flange arranged along an end of the intermediate body portion and a second flange arranged along an opposite end of the intermediate body portion;
   wherein the flexible sheet of material is capable of being flexed into an arched shape and sized to be insertable into the conventional oven depending on the amount of flexure of the sheet of material;
   wherein the first flange and the second flange are shaped so that they are capable of being inserted and held with a tension against a sidewall support structure of the conventional oven when the flexible sheet of material is flexed into the arched shape and released during installation within the conventional oven;
   wherein the flexible sheet of material lies substantially flat in a relaxed, unflexed condition.

2. The universal convection manipulation device of claim 1, wherein the substantially rectangular flexible sheet of material includes a width of from about 15.5 inches to about 17 inches and is capable of leaving a gap of at least one inch with a back wall portion of the conventional oven when installed therein.

3. The universal convection manipulation device of claim 1, wherein each of the first flange and the second flange extends upwardly at an angle with respect to the intermediate body portion in a relaxed, unflexed condition of the flexible sheet of material.

4. The universal convection manipulation device of claim 3, wherein each of the first flange and the second flange extends upwardly at an angle of from about 45° to about 52° with respect to the intermediate body portion.

5. The universal convection manipulation device of claim 1, wherein the substantially rectangular flexible sheet of material includes a length of from about 26 inches to about 32 inches.

6. The universal convection manipulation device of claim 1, wherein each of the first flange and the second flange includes a friction-reducing coating applied thereto.

7. The universal convection manipulation device of claim 1, wherein a lower surface of the substantially rectangular flexible sheet of material includes a heat reflective surface.

8. The universal convection manipulation device of claim 1, wherein the intermediate body portion includes at least two sheets arranged to be releasably connectable by way of a joint.

9. A universal convection manipulation device and conventional oven comprising:
   a substantially rectangular flexible sheet of material capable of being flexed into an arched shape and sized to be insertable into the conventional oven depending on the amount of flexure of the sheet of material, the flexible sheet of material including a length of from about 26 inches to about 32 inches and a width of from about 15.5 inches to about 17 inches thereby being configured to leave a gap of at least one inch with a back wall portion of the conventional oven when installed therein;
   a first flange being arranged along an end of the flexible sheet of material and a second flange being arranged along an opposite end of the flexible sheet of material and being shaped so as to be held with tension against a sidewall support structure of the conventional oven when the flexible sheet of material is flexed into the arched shape and released when installed within the conventional oven;
   wherein the flexible sheet of material lies substantially flat in a relaxed, unflexed condition.

10. The universal convection manipulation device of claim 9, wherein each of the first flange and the second flange extends upwardly at an angle with respect to the intermediate body portion in a relaxed, unflexed condition of the intermediate body portion.

11. The universal convection manipulation device of claim 10, wherein each of the first flange and the second flange extends upwardly at an angle of from about 45° to about 52° with respect to the intermediate body portion.

12. The universal convection manipulation device of claim 9, wherein the intermediate body portion includes at least two sheets arranged to be connectable by way of a joint.

13. The universal convection manipulation device of claim 12, wherein the joint allows the at least two sheets of the intermediate body portion to be separable.

14. The universal convection manipulation device of claim 12, wherein the joint is a hinge allowing the at least two sheets to fold out no further than about 180°.

15. The universal convection manipulation device of claim 9, wherein a lower surface of the substantially rectangular flexible sheet of material includes a heat reflective surface.

16. A method of creating a high-heat baking oven in a conventional convection oven comprising:
providing a substantially rectangular flexible sheet of material including an intermediate body portion and a first flange arranged along an end of the intermediate body portion and a second flange arranged along an opposite end of the intermediate body portion;
flexing the substantially rectangular flexible sheet of material into an arched shape that is smaller than a width of an opening of the conventional oven;
inserting the flexed substantially rectangular flexible sheet of material into the conventional oven such that the first flange and the second flange align approximately with a sidewall support structure of the conventional oven; and
releasing the flexed substantially rectangular flexible sheet of material such that a flexibility of the sheet creates a tension that allows the flexed substantially rectangular flexible sheet of material to be held with tension against a sidewall support structure of the conventional oven.

17. The method of creating a high-heat baking oven in a conventional convection oven of claim 16, wherein inserting the flexed substantially rectangular flexible sheet of material fully into the conventional oven includes leaving at least about a 1 inch gap with a back wall of the conventional oven.

18. The method of creating a high-heat baking oven in a conventional convection oven of claim 16, wherein providing a substantially rectangular flexible sheet of material includes providing a flexible sheet of material including a length of from about 26 inches to about 32 inches and a width of from about 15.5 inches to about 17 inches.

19. The method of creating a high-heat baking oven in a conventional oven of claim 16, wherein providing a substantially rectangular flexible sheet of material includes an intermediate body portion including at least two sheets connected by way of a joint.

20. The method of creating a high-heat baking oven in a conventional oven of claim 16, wherein each of the first flange and the second flange extends upwardly at an angle with respect to the intermediate body portion in a relaxed, unflexed condition of the intermediate body portion.

* * * * *